Nov. 6, 1956
H. A. BRAENDLE
2,769,795
METHOD OF COMPOUNDING CARBON BLACK AND RUBBER
Filed Feb. 1, 1956
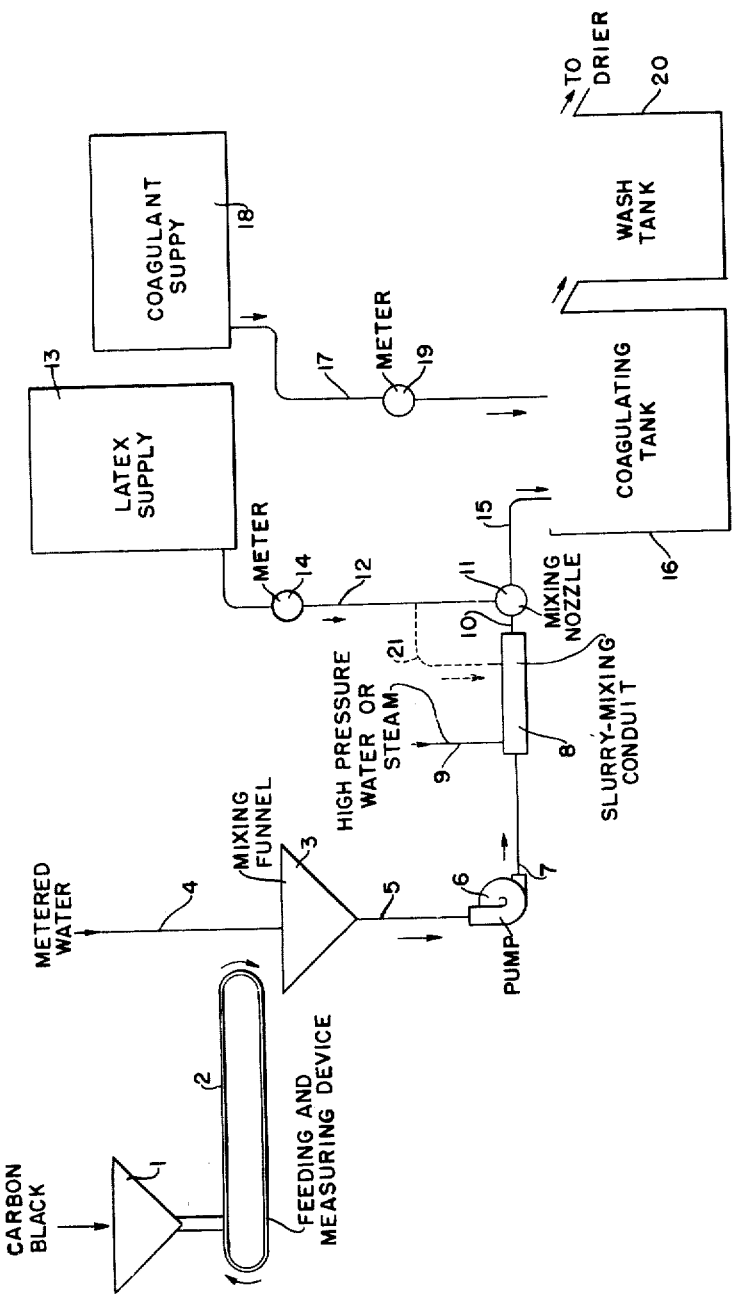
INVENTOR
HAROLD A. BRAENDLE
BY
*Pennie, Edmonds, Morton, Barrows & Taylor*
ATTORNEYS

2,769,795

METHOD OF COMPOUNDING CARBON BLACK AND RUBBER

Harold A. Braendle, Garden City, N. Y., assignor to Columbian Carbon Company, New York, N. Y., a corporation of New York Application February 1, 1956, Serial No. 562,900

13 Claims. (Cl. 260—41.5)

This invention relates to the compounding of rubber and carbon black and provides an improved method of agglutinating carbon black and natural or synthetic rubber, or other polymeric materials.

Carbon black is widely used as a reinforcing agent in rubber. It has long been conventional practice to incorporate the carbon black in the rubber, after coagulation, by vigorous milling. This method has proved tedious and costly and, in some instances, has deleteriously affected the properties of the finished rubber product.

For many years, extensive effort has been made by the industry to develop an effective and commercially practical method of dispersing carbon black in rubber by mixing the black with the rubber latex prior to coagulation of the rubber, but, to my knowledge, present methods, while operable, leave much to be desired.

Current practice involves the grinding of the pelletized black in dry form and dropping the dust into a large vat containing water, a dispersing agent and a stabilizing agent, agitating to form a stable aqueous suspension of the carbon black and adjusting the pH of the suspension to that of the latex by adding caustic soda, or the like. The carbon black suspension is usually prepared in large batches and subsequently a portion of the batch, containing the dispersing agent, stabilizing agent, carbon black, water and alkali, is mixed with a predetermined amount of the latex. Thereafter, salt or other creaming agent is added to the latex mixture, and when creaming has been effected, a coagulant, for example sulfuric acid or alum, is added and the resultant coagulum separated from the serum and dried. Thus the process is essentially a batch, or discontinuous operation.

Where this method has been used, a substantial proportion of the carbon black has been found to remain in the serum following coagulation and separation of the rubber, thus resulting in a loss of carbon black and a disproportionate amount of carbon black in the rubber. Also, difficulty has been experienced in the further processing of the rubber, and the characteristics of the resultant rubber compound have been generally inferior.

Efforts have been made to avoid the addition of so-called dispersing agents, i. e., agents for promoting dispersion of the carbon black in the water and preventing the settling out of the black. However, in practical operation, the use of such dispersing agents has heretofore been found necessary in order to maintain a uniform dispersion of the black, so as to control the proportion of black added to the latex, and to avoid excessive viscosity of the aqueous carbon black slurry during storage and processing.

It is an object of my present invention to provide a continuous process for agglutinating the carbon black with rubber, or the like, by which the presence of dispersing agents in the carbon black slurry, the grinding of the carbon black to form the aqueous dispersion, and other objectionable features of present practices may be entirely avoided. These and other objects are attained by my present invention, as will more clearly appear from the following disclosure thereof.

In accordance with my present process, a slurry of carbon black and water of uniform composition is continuously prepared as a flowing stream by continuously combining the carbon black at a predetermined rate with a stream of water flowing at a uniform rate, and uniformly dispersing the carbon black in the stream of water, without grinding and, advantageously, without adding a dispersing or stabilizing agent, by subjecting the black to violent hydraulic agitation and impact. The black may be added to the system either in dry form or premixed with a portion of the water.

The resultant stream of slurry is immediately after its formation, while agitation is being continued to prevent any separation or localized concentration of carbon black, substantially instantaneously, uniformly mixed with a stream of the latex under conditions of violent hydraulic agitation and impact.

The resultant latex mixture is then immediately coagulated by adding and thoroughly mixing therewith a coagulating agent such as conventionally used, for instance, sulfuric acid. The resultant rubber crumb, having the carbon black uniformly dispersed therein, is then separated from the serum and dried in the usual manner.

I have found that, in the absence of dispersing agents, or suspension stabilizing agents, such as conventionally used in the preparation of carbon black slurries for mixing with rubber latices, the conventional step of adjusting the pH characteristic of the slurry to that of the latex can be eliminated and that, under such conditions, the carbon black acts as a creaming agent for the latex. Thus the conventional step of adding salt, or other creaming agent, to effect the creaming of the latex prior to coagulation, may also be eliminated.

However, for best results, it is essential, in accordance with my present invention, that the step of coagulating the latex mixture by agitating with a conventional coagulation agent, acid, for instance, immediately follow the uniform mixing of the black with the latex. It is also necessary that the mixing of the black with the latex be exceedingly rapid, substantially instantaneous mixing, in order to avoid the forming of agglomerates of the rubber with excessively high proportions of the carbon black. Where such agglomerates are formed, it is very difficult, if not impossible, to disperse them in the rubber by subsequent milling.

I have found that, for most advantageous results, the period of time between the initial contact between the stream of slurry and the stream of latex and the adding of the coagulating agent should not exceed a fraction of a second, more advantageously, of the order of one-tenth second, or less. However, in small scale operations, a time lapse of several seconds has given satisfactory results.

It will be understood that reference herein, and in the appended claims, to hydraulic agitation and impact is intended to mean a violent fluid action, such as impact of high velocity fluid streams, or violent turbulence of a confined flowing stream, effected mechanically, or otherwise, as distinguished from a smearing or grinding action.

Previous efforts to effect dispersion of carbon black and water by grinding, have presented serious difficulties due to erosion of the grinding surfaces by the carbon black and the plugging and stoppage of the grinding mill. The continuous production of uniform streams of carbon black slurry by such methods have proved impractical, if not impossible. Those difficulties are avoided, in accordance with my present invention, by effecting a tearing apart of the carbon black pellets and agglomerates by violent fluid action, i. e., by violent hydraulic agitation and impact, as heretofore defined.

By avoiding the step of raising the pH of the slurry to that of the latex before mixing the two, the subsequent coagulation can be effected by a much smaller amount of acid coagulant than customarily used. And by avoiding the use of dispersing agents in forming the carbon black slurry, the deleterious effect of such compounds in the resultant rubber is avoided.

The process has the further advantage of continuity and uniformity of operation and the avoidance of the necessity of providing mixing and storage tanks for preformed carbon black suspension. It avoids the cost and deleterious effects of dispersing and stabilizing agents, as previously noted, and eliminates the necessity of grinding the carbon black.

The process is applicable to all types of carbon black whether pelleted or in the flocculent form and is also applicable to the agglutination of the black with either synthetic or natural rubber or other polymeric material available in latex form.

The process is of particular utility in agglutinating carbon black in synthetic rubber of the GRS type and especially such synthetic rubber in the preparation of which the polymerization of butadiene and styrene is effected at low temperatures, i. e., so-called low temperature polymers or "cold rubber."

The process of the invention will be further illustrated with reference to the accompanying flow diagram. The carbon black selected to be mixed with the rubber, either beaded or in powder form, is continuously charged to the system through a hopper 1 to a feeding and measuring device indicated at 2 from which it is dropped at a predetermined, constant rate into mixing funnel 3. Suitable automatic feeders for pulverulent materials are well known to the art, for instance star powder feeders or the so-called Jeffrey Weightrol, and need not here be described. Water is continuously charged to the mixing funnel at a predetermined constant rate through a conduit represented at 4 and the premixed carbon black and water continuously passed directly from the funnel as a flowing stream through conduit 5 to a pump 6, advantageously of a centrifugal type, and is forced by the pump through conduit 7 to the slurry mixing conduit 8.

As the stream of carbon black and water enters the slurry mixing conduit, it is struck by a high velocity stream of the remaining portion of the water or steam charged to the mixing conduit at a predetermined rate through conduit 9. By reason of the impact of the entering streams, the carbon black is thoroughly and uniformly dispersed in the water while flowing through the slurry mixing conduit and the black is maintained in uniform suspension by continued turbulence therein. The resultant uniform slurry passes continuously from the mixing conduit through conduit 10 to mixing nozzle 11 in which the stream is subjected to hydraulic agitation and impact with a stream of latex passing to the mixing nozzle through conduit 12 from a convenient latex supply indicated at 13 at a predetermined rate controlled by meter 14 positioned in conduit 12. The injection of the latex stream is with advantage effected by maintaining a gas pressure on the upper surface of the body of latex 13.

The resultant uniform mixture of latex and carbon black slurry is passed directly from the mixing nozzle through conduit 15 into a coagulating tank, indicated at 16, where it is immediately mixed with coagulant charged to the tank through conduit 17 from any convenient source, such as indicated at 18, at a rate determined and controlled by a metering device indicated at 19. The resultant coagulated mixture overflows from tank 16 into wash tank 20 in which the resultant rubber crumb, having the carbon black uniformly dispersed therein, is separated from the serum and the crumb is passed therefrom to a conventional dryer.

As previously stated herein, the hydraulic agitation and impact may be effected by impact of high velocity streams, as just described, or by mechanical agitation of the flowing stream or by a combination of the two, or by any other means by which a flowing fluid stream is subjected to violent agitation and maintained in a state of agitation to prevent settling out of the carbon particles prior to uniform mixing with the latex.

The hydraulic agitation and impact for forming the slurry is, with advantage, effected by feeding dry black directly to the slurry mixing conduit and hitting the black as it enters the slurry mixing conduit with a high velocity stream of water or water and steam. As an alternative procedure, the black may first be roughly dispersed in the water, or a portion thereof, as shown on the flow sheet and this mixture subjected to violent impact with a high velocity stream of steam or of the remainder of the water. Where all of the water is premixed with the carbon black, steam may be injected through conduit 9. The mixing of the resultant aqueous suspension of the black with the latex is, with advantage, effected either by violent impact of high velocity streams of carbon black suspension and latex, as shown in the accompanying flow sheet, or by violent mechanical agitation or a combination of the two.

I have, with advantage, employed mechanical agitating means for effecting the necessary violent hydraulic impact. For instance, the black and water may be continuously supplied in predetermined proportions to one end of an elongated mixing conduit and the resultant stream subjected to violent mechanical agitation as it flows through the conduit. The dimensions and construction of the mixing conduit should be such as to insure thorough uniform mixing of the entire stream so as to avoid any settling out or localized concentration of the carbon black. A stream of the latex is then suddenly mixed with the resultant slurry stream either while the agitation is being continued or immediately thereafter. This mixing may be effected by impact of high velocity streams or by violent turbulence to give substantially instantaneous, uniform mixing.

For instance, a stream of the latex may be continuously fed at a constant, predetermined rate to a zone of an elongated slurry mixing conduit intermediate the ends of the conduit and downstream from the zone in which the slurry is formed, as indicated at 21, said mixing conduit being provided with agitating means extending over substantially its entire length. Where this arrangement is used, the mixing nozzle 11 and the latex line leading thereto will not be used. In this way, the latex is mixed with the slurry while the latter is itself in a state of violent agitation and the agitation is continued as the mixture proceeds through the conduit. The violent agitation within the conduit may be effected solely by means of mechanical agitation, or by means of impact of high velocity streams, or by a combination of such means adapted to effect violent hydraulic impact.

The following example is given as illustrative of operations in accordance with the present invention in which the hydraulic agitation and impact is effected by the impact of high velocity fluid streams in the system represented by the accompanying flow diagram.

*Example I*

Carbon black at a uniform rate of 264 lbs. per hour and water at a uniform rate of 1800 lbs. per hour are premixed to form a flowing stream and the stream is charged, as formed, under pressure to the slurry mixing conduit through an inlet opening of about ½ inch in diameter. Steam at a pressure of 160 lbs. per square inch is charged to the slurry mixing conduit at a rate of 213 lbs. per hour so as to impinge, at a velocity of about 1500–1800 ft. per second, at substantially right angles upon the entering stream of carbon black-water mixture. The resulting slurry is passed directly from the slurry mixing conduit to mixing nozzle 11 and is there uniformly blended with a stream of latex charged to the mixing nozzle through a ½ inch nozzle inlet at a uniform rate of 2780 lbs. per hour (dry weight of rubber 528 lbs. per hour). On leaving the mixing nozzle the latex-black mixture is passed directly to the coagulating tank and is there immediately mixed with an acid coagulant. The resultant rubber crumb is then separated from the serum, washed and dried, yielding approximately 790 lbs. of dried solid per hour. In this operation, the time period between contact between slurry and latex and coagulation is less than one second. The separated serum is found to be substantially free from carbon black.

Where water at sufficiently high pressure is available, it may be used in lieu of steam as the impacting stream, in which case either no water, or only a part of the water, is premixed with the carbon black.

The following examples are given as illustrative of operations at which the hydraulic agitation and impact is effected within the slurry mixing conduit by means of a high speed mechanical blender substantially coextensive in length with that of the mixing conduit.

Example II

Carbon black at a uniform rate of 430 lbs. per hour and water at a uniform rate of 4800 lbs. per hour are premixed and charged to the upstream end of a mixing conduit 4 inches I. D. and 30 inches long. Latex at a uniform rate of 4525 lbs. per hour is charged to the mixing conduit at a point spaced about 10 inches from its outlet end. The agitator within the conduit is operated at a speed of about 5000–6000 R. P. M. The resultant mixture of carbon black slurry and latex is passed immediately to a coagulating tank and the rubber crumb, having the carbon black uniformly dispersed therethrough, is coagulated by the addition of acid, the crumb separated from the serum, washed and dried, yielding approximately 1290 lbs. of dry solid per hour. The time lapse between initial mixing of the slurry with the latex and coagulation of the latex was between two and three seconds.

Example III

Carbon black at a uniform rate of 1000 lbs. per hour and water at a uniform rate of 11,000 lbs. per hour are premixed and charged to the upstream end of a mixing conduit 6 inches I. D. and 30 inches long. Latex at a uniform rate of 10,530 lbs. per hour is charged to the mixing conduit at a point spaced about 10 inches from its outlet end. The agitator within the conduit is operated at a speed about 3000–4000 R. P. M. The resultant mixture of carbon black slurry and latex is passed immediately to a coagulating tank and the rubber crumb, having the carbon black uniformly dispersed therethrough, is coagulated by the addition of acid, the crumb separated from the serum, washed and dried, yielding approximately 3000 lbs. of dry solid per hour. The time lapse between initial mixing of the slurry with the latex and the coagulation of the latex was between 2 and 3 seconds.

By either of these procedures, the process is continuous and the proportions of carbon black mixed with the rubber are readily controlled. The necessity of storage vessels for preformed carbon black slurry and the danger of lack of uniformity of proportions of carbon black in the finished product, due to variations of the proportion of carbon black in the preformed slurry used, are entirely avoided. After the proportioning devices have been set to give the desired proportions, the process may be carried on continuously with a minimum of attention from operators. The invention has the further advantage of relatively low cost and readily available equipment with a minimum of factory space required for the operation.

The proportion of carbon black used may vary within the range conventionally used as reinforcing agent in the compounding of rubber, and the like, for instance, from 30 to 70 or more parts of dry carbon black per 100 parts of rubber solid.

In operations, in accordance with the process of my invention, substantially all of the carbon black added to the latex is taken up by the coagulated polymer and a substantially clear serum is obtained, thus avoiding loss of any substantial amount of the carbon black or rubber.

Further, compounded rubbers, more particularly tire tread compound, in the preparation of which the carbon black is dispersed in the latex as herein described, will be found to have a faster curing rate and a higher modulus and better wear characteristics than that prepared by conventional procedure.

In addition to the dispersing of the carbon black in the rubber, the invention also contemplates the inclusion of various other rubber compounding and modifying agents, for instance, softening agents, such as oil emulsions, and various compounds or compositions for modifying the characteristics of the rubber crumb. Such materials may be premixed with the latex or with the carbon black, or with the carbon black slurry, or with the water used in forming the slurry. Softening oils, or distenders, such as usually added in emulsion form, may be added to the system prior to emulsifying and the emulsification thereof effected by the violent hydraulic agitation and impact previously described.

The present application is, in part, a continuation of my copending application Serial No. 387,509, filed October 21, 1953, and application Serial No. 276,223, filed March 12, 1952, which was copending therewith.

I claim:

1. In the process of producing dispersions of carbon black in rubber in which the black is mixed with the rubber while in latex form and the carbon black-latex mixture thereafter coagulated, the steps of continuously mixing the carbon black in a uniform, predetermined proportion with a flowing stream of water under conditions of violent hydraulic turbulence and impact, and thereby forming a continuously flowing, confined stream of an aqueous carbon black slurry of uniform composition, immediately, and substantially instantaneously, uniformly mixing a stream of the latex in uniform, predetermined proportions with the resultant stream of slurry under conditions of violent hydraulic turbulence and impact and, immediately following the mixing, coagulating the resultant mixture by adding a coagulating agent thereto with agitation.

2. In the process of producing dispersions of carbon black in rubber in which the black is mixed with the rubber while in latex form and the carbon black-latex mixture thereafter coagulated, the steps of continuously charging the carbon black to a mixing conduit, striking the black as it enters the conduit with a high velocity stream of water, the water and carbon black being supplied in uniform predetermined proportions, and thereby suspending the carbon black in the water, continuing the flow of the resultant suspension through the conduit as a turbulent stream and uniformly mixing the turbulent stream of the suspension with a stream of the rubber latex and continuing agitation of the mixture until coagulation has been effected.

3. In the process of producing dispersions of carbon black in rubber in which the black is mixed with the rubber while in latex form and the carbon black-latex mixture thereafter coagulated, the steps of continuously charging the carbon black to a mixing conduit, striking the black as it enters the conduit with a high velocity stream of water, the water and carbon black being supplied in uniform predetermined proportions, thereby suspending the carbon black in the water in the absence of added dispersing agent and continuing the flow of the resultant suspension through the conduit as a turbulent stream of aqueous carbon black slurry of a uniform composition, immediately, and substantially instantaneously, uniformly mixing a stream of rubber latex in uniform, predetermined proportions with the resultant stream of slurry under conditions of violent hydraulic turbulence and impact and, immediately following the mixing, coagulating the resultant mixture by adding a coagulating agent thereto with agitation.

4. The process of producing dispersions of carbon black in rubber in which the black is mixed with the rubber while in a latex form and the carbon black-latex mixture thereafter coagulated, the steps of continuously adding the carbon black to a confined flowing stream of water, the carbon black and water being in uniform measured proportions, uniformly dispersing the carbon black in the water, in the absence of added dispersing agent, under conditions of violent hydraulic turbulence and impact thereby forming a continuously flowing confined stream of an aqueous carbon black slurry of uniform composition, immediately, and substantially instantaneously, uniformly mixing a stream of the latex in uniform predetermined proportions with the resultant stream of slurry by blending the two streams in uniform predetermined proportions under conditions of violent hydraulic agitation and impact and, immediately following the mixing, coagulating the resultant mixture by adding a coagulating agent thereto with agitation.

5. In the process of producing dispersions of carbon black in rubber in which the black is mixed with the rubber while in latex form and the carbon black-latex mixture thereafter coagulated, the steps of continuously charging the carbon black and water in uniform predetermined proportions to a mixing chamber, subjecting the black-water mixture in the chamber to violent hydraulic agitation and impact, in the absence of added dispersing agent, and thereby forming a continuously flowing confined stream of aqueous carbon black slurry of uniform composition, immediately, and substantially instantaneously, uniformly mixing a stream of the latex in uniform predetermined proportions with the resultant stream of slurry under conditions of violent hydraulic turbulence and impact and, immediately following the mixing, coagulating the resultant mixture by adding a coagulating agent thereto with agitation.

6. The process of producing dispersions of carbon black in rubber in which the black is mixed with the rubber while in latex form and the carbon black-latex mixture thereafter coagulated, the steps of continuously charging the carbon black and water in uniform predetermined proportions to a mixing conduit, passing the carbon black and water through said conduit as a flowing stream and therein subjecting the mixture to violent hydraulic turbulence and impact, in the absence of added dispersing agent, and thereby forming a continuously flowing confined stream of an aqueous carbon black slurry of uniform composition, immediately, and substantially instantaneously, uniformly mixing a stream of the latex in uniform predetermined proportions with the resultant stream of slurry under conditions of violent hydraulic turbulence and impact and, immediately following the mixing, coagulating the resultant latex mixture by adding a coagulating agent thereto with continued agitation.

7. The process of claim 1 in which the period of time between initial contact between the stream of slurry and the stream of latex and the mixing of the coagulating agent with the latex mixture does not exceed about one-tenth second.

8. The process of claim 1 in which the mixing of the slurry with the latex is effected without adjustment of the pH characteristics of the slurry.

9. The process of claim 1 in which the carbon black is a furnace black.

10. The process of claim 9 in which the latex is a synthetic rubber latex.

11. The process of claim 10 in which the synthetic rubber latex is a copolymer of butadiene and styrene.

12. The process of claim 11 in which the latex is a low temperature copolymer of butadiene and styrene.

13. In the process of producing dispersions of carbon black in rubber in which the carbon black is mixed with the rubber while in latex form and the carbon black-latex mixture thereafter coagulated, the steps of producing a continuously flowing, confined stream of an aqueous suspension of carbon black of uniform composition by continuously mixing the carbon black and water in uniform, predetermined proportions under conditions of violent hydraulic turbulence and impact, in the absence of added dispersing agent, continuously blending the resultant stream of suspension, before any separation or localized concentration of carbon black can occur therein, with a stream of the latex in uniform proportions and, substantially instantaneously, uniformly mixing the two streams under conditions of violent hydraulic turbulence and impact and, immediately following the mixing, coagulating the resultant mixture by adding a coagulating agent thereto with agitation.

No references cited.

UNITED STATES PATENT OFFICE
CERTIFICATE OF CORRECTION

Patent No. 2,769,795                                                        November 6, 1956

Harold A. Braendle

It is hereby certified that error appears in the above numbered patent requiring correction and that the said Letters Patent should read as corrected below.

In the grant, lines 2 and 3, for "assignor to Columbian Carbon Company of New York, N. Y., a corporation of New York," read -- assignor to Columbian Carbon Company, of New York, N. Y., a corporation of Delaware, --; in the heading to the printed specification, for "assignor to Columbian Carbon Company, New York, N. Y., a corporation of New York" read -- assignor to Columbian Carbon Company, New York, N. Y., a corporation of Delaware --.

Signed and sealed this 15th day of October 1957.

(SEAL)

Attest:

KARL H. AXLINE
Attesting Officer

ROBERT C. WATSON
                                                                               Commissioner of Patents